(No Model.)

C. E. BROMWELL.
HAND MOTOR.

No. 401,637. Patented Apr. 16, 1889.

WITNESSES:
Robert Kirk
Robt S. Millar

INVENTOR:
Chas. E. Bromwell
By
Attorney.

UNITED STATES PATENT OFFICE.

CHARLES EDWARD BROMWELL, OF HELENA, ARKANSAS.

HAND-MOTOR.

SPECIFICATION forming part of Letters Patent No. 401,637, dated April 16, 1889.

Application filed June 19, 1888. Serial No. 277,605. (No model.)

*To all whom it may concern:*

Be it known that I, CHARLES EDWARD BROMWELL, of Helena, in the county of Phillips and State of Arkansas, have invented a new and useful Improvement in Hand-Motors, which improvement is fully set forth in the following specification and accompanying drawings, in which—

Figure 1:
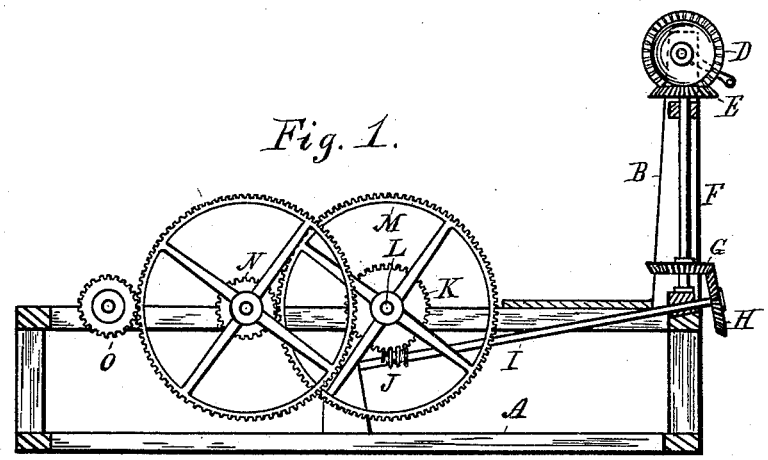
Figure 2:
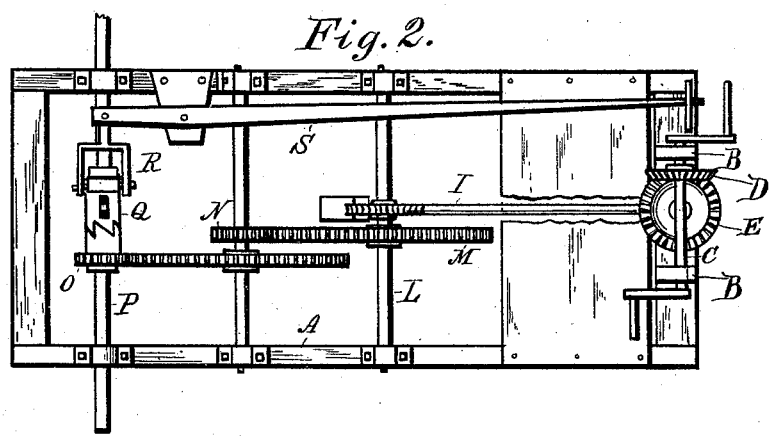

Figure 1 is a side elevation of my improved motor, and Fig. 2 a top or plan view of the same.

My invention relates to motors which are designed to be operated by hand-power; and its object is to provide a simple, useful, and portable device which may be readily and effectively applied to various purposes.

When provided with flanged wheels, it is available for tram-cars designed to carry freight or passengers. If it be preferred to increase the power of the device, one of the series of shafts and gear-wheels may be dispensed with. In this form it is peculiarly adapted for use in mines, or for moving material from place to place in factories or store-houses. When desired, the tram-wheels may be readily removed and paddle-wheels substituted therefor. It can then be transferred to row-boats, and will be found preferable in every respect to oar propulsion, chiefly for the reason that the operator faces to the front, and is therefore better able to govern the craft at will.

The device consists of a frame-work, A, which may be made of wood or cast-iron, and is so combined with the mechanism that it may be readily and entirely transferred to and from boats and tram-cars. At the forward end of this frame a standard, B, is fixed for the support of a crank-shaft, C, carrying a beveled wheel, D, which engages a similar wheel, E, attached to the upper end of a vertical shaft, F, the lower end of which is also provided with a beveled wheel, G, which in turn engages a similar wheel, H, attached to the forward end of the shaft I. The rear end of this shaft carries a worm, J, by which the motion is transmitted to a worm-wheel, K, on the transverse shaft L. This shaft also carries a wheel, M, which drives a pinion and wheel on the shaft N, through which the motion is conveyed to a pinion, O, on the shaft P, to which the wheels of a tram-car or paddle-wheels of a boat may be attached. A clutch, Q, is connected by a link, R, to the lever S, which extends forward within reach of the operator, who may readily disengage or connect the train at pleasure, and thereby stop the mechanism at any desired point and have it in readiness to be moved again when necessary. This is of special value where the mechanism is used in connection with a tram-car.

The power of the motor may be readily doubled by attaching a crank to each end of the power-shaft.

I am aware that heretofore in various forms and combinations trains of gear-wheels and pinions, with their operative mechanism, have been used, and therefore make no broad claim to such.

What I claim as new is—

A motor consisting of the portable frame-work A, having at one end the standards B, the crank-shaft C, supported thereby and carrying the beveled wheel D, the vertical shaft F, having the beveled wheel E attached to its upper end and at its lower end the beveled wheel G, combined with the shaft I, having beveled wheel H and worm J, the worm-wheel K, meshing with said worm, the gear-wheel M, the shaft N, and its pinion and wheel, the pinion O, and shaft P, the clutch Q, link R, and lever S, all substantially as and for the purposes set forth.

In testimony that I claim the foregoing I have hereunto set my hand this 26th day of December, 1887, in the presence of witnesses.

CHARLES EDWARD BROMWELL.

Witnesses:
J. H. GRANT,
F. MOORE.